(12) United States Patent
McKay

(10) Patent No.: US 9,434,207 B2
(45) Date of Patent: Sep. 6, 2016

(54) WHEEL RIM DESIGN

(71) Applicant: Sharon McKay, Queens, NY (US)

(72) Inventor: Sharon McKay, Queens, NY (US)

( * ) Notice: Subject to any disclaimer, the term of this patent is extended or adjusted under 35 U.S.C. 154(b) by 188 days.

(21) Appl. No.: 14/273,703

(22) Filed: May 9, 2014

(65) Prior Publication Data
US 2015/0321510 A1 Nov. 12, 2015

(51) Int. Cl.
B60B 27/00 (2006.01)
B60B 7/04 (2006.01)
B60B 7/00 (2006.01)

(52) U.S. Cl.
CPC .............. B60B 7/04 (2013.01); B60B 7/0033 (2013.01); B60B 27/00 (2013.01)

(58) Field of Classification Search
CPC ....... B60B 27/00; B60B 7/00; B60B 7/0033; B60B 7/04
USPC .............................. 301/63.101, 37.109, 105.1
See application file for complete search history.

(56) References Cited

U.S. PATENT DOCUMENTS

| | | | | |
|---|---|---|---|---|
| D533,823 S | * | 12/2006 | Starling | D12/209 |
| D535,931 S | * | 1/2007 | Beigel | D12/204 |
| 7,407,033 B2 | * | 8/2008 | Wilson | B60B 7/20 180/371 |
| 2003/0030320 A1 | * | 2/2003 | Smith | B60B 7/0053 301/37.42 |
| 2008/0036285 A1 | * | 2/2008 | Davis | B60B 7/0066 301/37.25 |
| 2012/0200144 A1 | * | 8/2012 | Hodges | B60B 1/08 301/104 |
| 2014/0306510 A1 | * | 10/2014 | Thomas | B60B 7/04 301/37.107 |

OTHER PUBLICATIONS

Louis Marcel and Fernand Renault, Logo designer, http://www.logo-designer.co/renault-logo-history-117-years-of-brand-identity/, 2004.*
Mavic History, http://www.mavic.com/history, 1973.*

* cited by examiner

Primary Examiner — S. Joseph Morano
Assistant Examiner — Jean Charleston
(74) Attorney, Agent, or Firm — The Law Office of Jerry D. Haynes

(57) ABSTRACT

A wheel design which includes: a rectangular display positioned at the center of the wheel; a diamond display centered within the rectangular display; crossbars including a horizontal mounting bar and a vertical mounting bar, where the crossbars support the rectangular display and cross at the center of the wheel, wherein the crossbars extend beyond the rectangular display; a first rectangular display at a top end of the vertical mounting bar; a second rectangular display at a bottom end of the vertical mounting bar; a third rectangular display at a left end of the horizontal mounting bar; and a fourth rectangular display at a right end of the horizontal mounting bar. Each respective rectangular display includes a diamond display centered therein.

2 Claims, 1 Drawing Sheet

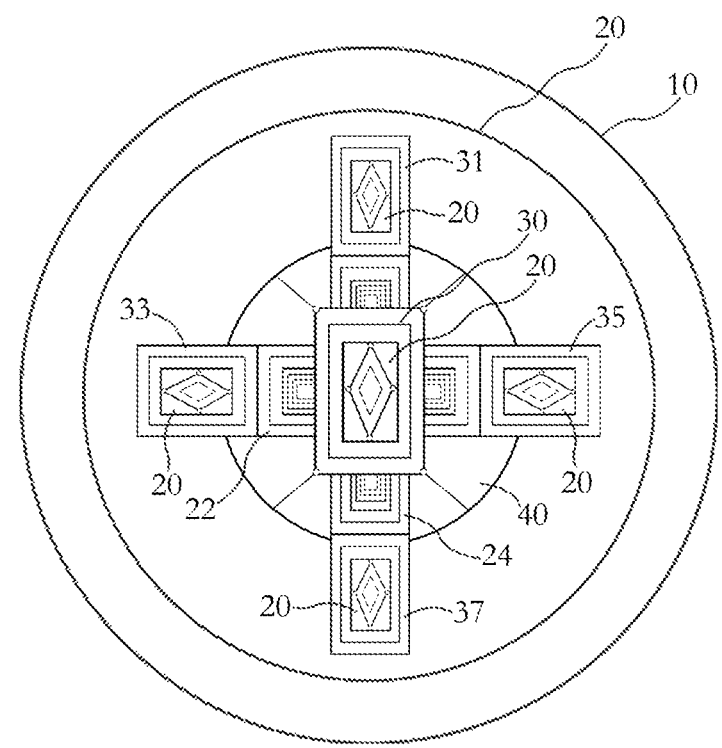

WHEEL RIM DESIGN

BACKGROUND OF THE INVENTION

1. Field of Invention

The present invention relates to a cross-shaped wheel design for a vehicle wheel.

2. Description of Related Art

Vehicle wheels and rims are necessary to support tires on moving vehicles, in particular, cars and trucks. Normally the wheel is mounted onto a set of lug extensions that receive lug nuts mounting the wheel in place. The wheel may be customized or a standard wheel that may require a hub cap for decorative purposes. Many customized wheels have various designs and styles based upon implementation of chrome, polished steel and aluminum as exemplary materials used in wheels. Customized wheels are quite popular and are used on both automobiles and trucks. As a consequence there is always a need or desire for various designs and implementations of customized wheels.

SUMMARY OF THE INVENTION

The present invention relates to a wheel design which includes: a rectangular display positioned at the center of the wheel; a diamond display centered within the rectangular display; crossbars including a horizontal mounting bar and a vertical mounting bar, where the crossbars support the rectangular display and cross at the center of the wheel, wherein the crossbars extend beyond the rectangular display; a first rectangular display at a top end of the vertical mounting bar; a second rectangular display at a bottom end of the vertical mounting bar; a third rectangular display at a left end of the horizontal mounting bar; and a fourth rectangular display at a right end of the horizontal mounting bar. Each respective rectangular display includes a diamond display centered therein.

BRIEF DESCRIPTION OF DRAWINGS

FIG. 1 depicts a cross-shaped wheel design in accordance with the present invention.

DETAILED DESCRIPTION

The present invention relates to a cross-shaped wheel design to implement a series or a multitude of diamond displays over the cross shape. The present invention has a center display that includes a diamond-shaped display within the centerpiece. The centerpiece is mounted on two cross bars and at the end of each cross bar is a similar diamond-shaped display creating an overall cross shape with diamond configurations.

With respect to FIG. 1, a tire 10 is shown that is mounted on a wheel 25. At the center of the wheel 20 is a rectangular display 30. The rectangular display 30 includes a diamond display 20 centered within the rectangular display 30. The diamond display 20 creates a centerpiece of the wheel 25. The center display 30 is mounted on crossbars, horizontal mounting bar 22 and vertical mounting bar 24 shown extending below the rectangular center display. The crossing bars 22, 24 support the center display 30 and cross at the center of wheel 25.

Each mounting bar includes a rectangular display extending from the opposing ends of each respective bar. A top rectangular display 31 is shown at the top end of the mounting bar 24. A bottom rectangular display 37 is shown at the bottom of the vertical mounting bar 24. Each respective rectangular display includes the diamond display 20 as similarly shown in the center display 30. Similarly a left rectangular display 33 and a right rectangular display 35 are shown at each opposing end of the horizontal mounting bar 22. Within each rectangular display 33, 35 is a diamond display 20. These respective displays create an overall diamond appearance in the wheel 25. The overall design of this wheel 25 creates a series of diamond displays evenly spaced across the cross-shaped wheel design.

The instant invention has been shown and described in what it considers to be the most practical and preferred embodiments. It is recognized, however, that departures may be made there from within the scope of the invention and that obvious modifications will occur to a person skilled in the art.

What is claimed is:

1. A wheel design comprising:
   a. a rectangular display positioned at the center of the wheel;
   b. a diamond display centered within the rectangular display;
   c. crossbars including a horizontal mounting bar and a vertical mounting bar, where the crossbars support the rectangular display and cross at the center of the wheel, wherein the crossbars extend beyond the rectangular display;
   d. a first rectangular display at a top end of the vertical mounting bar;
   e. a second rectangular display at a bottom end of the vertical mounting bar;
   f. a third rectangular display at a left end of the horizontal mounting bar; and
   g. a fourth rectangular display at a right end of the horizontal mounting bar.

2. The wheel design according to claim 1, where the first rectangular display, the second rectangular display, the third rectangular display and the fourth rectangular display each include a diamond display centered within each rectangular display.

* * * * *